(12) United States Patent
Rozman et al.

(10) Patent No.: US 8,319,369 B2
(45) Date of Patent: Nov. 27, 2012

(54) GENERATOR FOR GAS TURBINE ENGINE HAVING MAIN DC BUS ACCESSORY AC BUS

(75) Inventors: Gregory I. Rozman, Rockford, IL (US); Kevin Dooley, Mississauga (CA)

(73) Assignees: Pratt & Whitney Canada Corp., Longueil, Quebec (CA); Hamilton Sundstrand Corporation, Windsor Locks, CT (US)

( * ) Notice: Subject to any disclaimer, the term of this patent is extended or adjusted under 35 U.S.C. 154(b) by 0 days.

(21) Appl. No.: 13/020,836

(22) Filed: Feb. 4, 2011

(65) Prior Publication Data

US 2011/0169328 A1    Jul. 14, 2011

Related U.S. Application Data

(63) Continuation of application No. 11/859,055, filed on Sep. 21, 2007, now Pat. No. 7,952,220.

(51) Int. Cl.
*B60L 1/00*       (2006.01)
*B60L 3/00*       (2006.01)

(52) U.S. Cl. ........................................................ 307/9.1

(58) Field of Classification Search ................ 307/9.1
See application file for complete search history.

(56) References Cited

U.S. PATENT DOCUMENTS

| | | |
|---|---|---|
| 5,939,800 A | 8/1999 | Artinian |
| 6,825,640 B1 | 11/2004 | Hill |
| 6,920,023 B2 | 7/2005 | Dooley |
| 6,936,948 B2 | 8/2005 | Bell |
| 6,965,183 B2 | 11/2005 | Dooley |
| 7,064,520 B2 | 6/2006 | Heigl |
| 7,126,313 B2 | 10/2006 | Dooley |
| 7,242,167 B2 | 7/2007 | Patterson |
| 7,262,539 B2 | 8/2007 | Dooley |
| 7,545,056 B2 | 6/2009 | Dooley |
| 7,550,866 B2 | 6/2009 | Breit et al. |
| 7,612,514 B2 | 11/2009 | Anghel et al. |
| 2006/0267540 A1* | 11/2006 | Chu et al. ........................ 318/778 |

* cited by examiner

*Primary Examiner* — Rexford Barnie
*Assistant Examiner* — Dru Parries
(74) *Attorney, Agent, or Firm* — Carlson, Gaskey & Olds, PC

(57) ABSTRACT

An aircraft electrical system includes a generator that supplies electrical AC power to a plurality of accessories associated with a gas turbine engine. The generator also supplies power to an aircraft DC bus in parallel to the supply to the accessory bus.

14 Claims, 1 Drawing Sheet

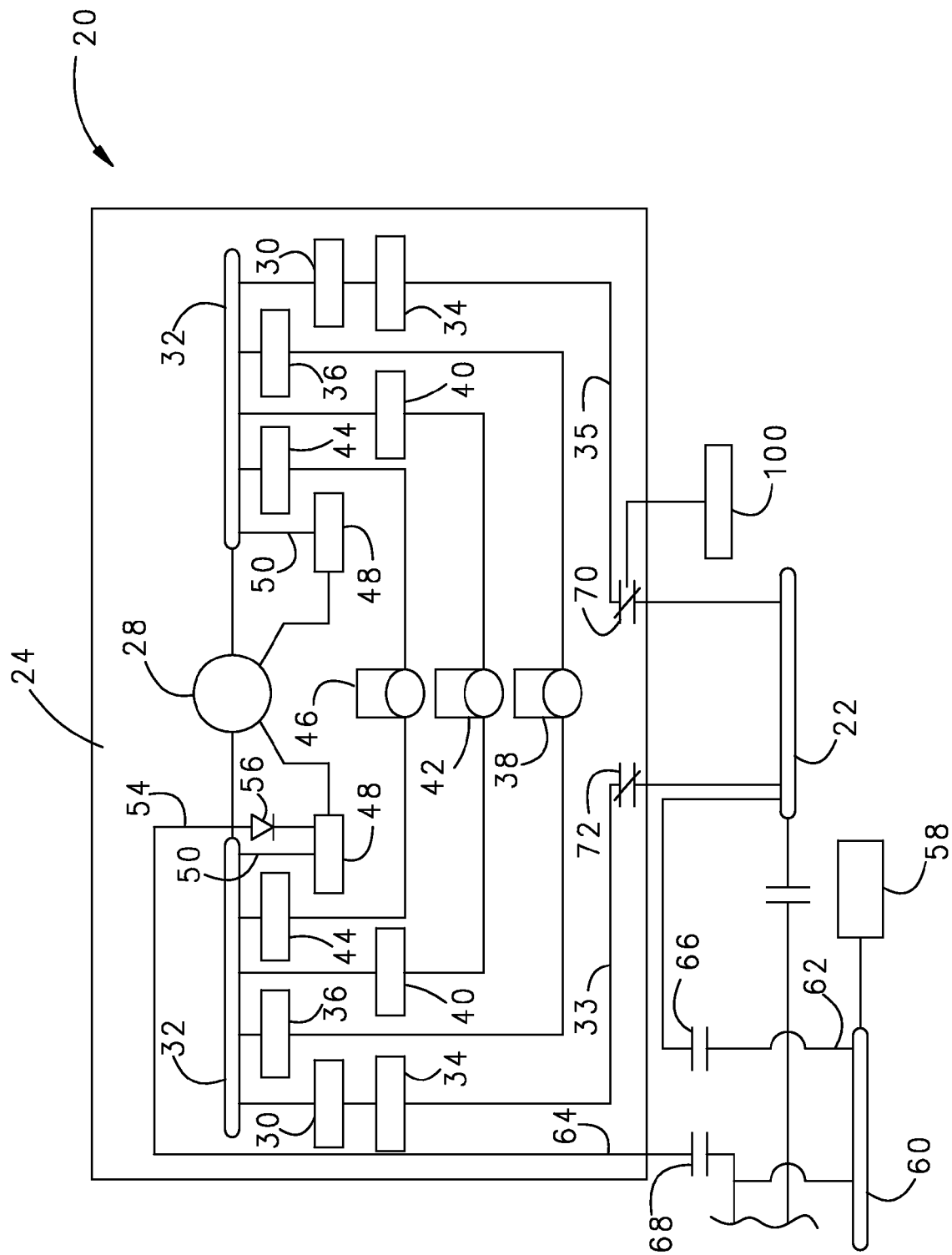

GENERATOR FOR GAS TURBINE ENGINE HAVING MAIN DC BUS ACCESSORY AC BUS

RELATED APPLICATION

This application is a continuation of U.S. patent application Ser. No. 11/859,055, which was filed Sep. 21, 2007 now U.S. Pat. No. 7,952,220.

BACKGROUND OF THE INVENTION

This application relates to an electric system for a generator in a gas turbine engine, which generates power for both an associated aircraft through a DC power bus, and engine accessories with AC power.

A power generating system for an aircraft converts motive power generated by a prime mover, such as gas turbine engine, to DC electrical power that is supplied to a DC bus to which various aircraft electrical components may be connected.

Recently, electric engine architecture has been developed which includes an integrated generator associated with a gas turbine engine. Power generated by the generator flows to an aircraft bus and, also to a plurality of engine accessories. Thus, the engine accessories are powered directly by the generated electric power and the power for other aircraft functions is also supplied from the generator. The aircraft bus and the accessories are powered in parallel relative to each other.

In these known electric engine architectures, even though the generated power is initially three phase AC, it is typically converted into DC. Generally, if a generator frequency is above 800 Hz, then shielded wires or conduits are required for AC power to be distributed about an aircraft. Shielded wires, or conduits, add significant weight and are thus undesirable. Thus, proposed systems have used inverter/rectifiers to convert the AC power into DC.

SUMMARY OF THE INVENTION

In a disclosed embodiment of this invention, an aircraft electrical system includes a generator supplying electrical AC power to a plurality of accessories associated with a gas turbine engine. The generator also supplies power to an aircraft DC bus in parallel to the supply to the accessories. A high frequency AC accessory bus may power the accessories.

These and other features of the present invention can be best understood from the following specification and drawings, the following of which is a brief description.

BRIEF DESCRIPTION OF THE DRAWINGS

FIG. 1 shows a schematic for a gas turbine engine associated with an aircraft.

DETAILED DESCRIPTION OF THE PREFERRED EMBODIMENT

FIG. 1 shows a system 20 including an engine 24 associated with an aircraft. The electrical system for engine 24 will be described, but it should be understood that a similar second engine, not illustrated, having a similar system, may be included. An aircraft DC bus 22 receives power from a generator 28, as will be explained. A pair of inverter/rectifiers 30 receive the power generated by the generator 28, and distribute that power to the aircraft DC bus 22. Power from the inverter/rectifiers 30 passes through filters 34, and through lines 33 and 35 to the aircraft DC bus 22. Motor controllers 36, 40 and 44 provide control to an air pump and its motor 38, a lube pump and its motor 42, and a fuel pump and its motor 46. The generator as disclosed is a permanent magnet generator, but this application does extend to other type generators. As is clearly shown in FIG. 1, there are also a pair of motor controllers 36, 40, 44 associated with each of the air pump motor 38, lube pump motor 42, and fuel pump motor 46. In addition, the accessory buses power a pair of voltage regulators 48.

As illustrated, generator 28 is an integrated starter-generator. However, it should be understood that this application extends not only to an integrated starter-generator operating in a generator mode, but also to stand-alone generators.

One known electrical system is disclosed in U.S. published patent applications 2004/039202A1, 2006/0226721A1, and 2006/0113967A1. The present invention is directed to improving upon these basic systems, as will be described below.

As mentioned above, the electrical systems in these applications have utilized DC power for both the accessory motors and the aircraft DC bus. In the present invention, an accessory bus 32 receives AC power from the generator 28. This high frequency AC current is utilized to drive the motors 46, 42, and 38 through the associated controllers 44, 40 and 36. Since the accessories are mounted adjacent or on the aircraft engine 24, there is no necessity for providing long shielding or conduit. Thus, the use of the AC current is practical for the accessory bus 32.

The use of high frequency AC for the engine accessory bus reduces dynamic interaction between system components. For example, in an architecture with a DC engine accessory bus, there could be undesirable voltage modulation on an engine accessory DC bus if the bus is connected to a high performance motor drive, such as a fuel pump. This phenomenon is known as a negative impedance instability. The high frequency AC bus 32 eliminates this possibility, and provides other valuable benefits.

One concern with the basic arrangement of system 20 occurs if a short circuit occurs on the aircraft DC bus 22. Since the accessory motors 38, 42 and 46 are in parallel with the aircraft DC bus 22, they may be drained to the short circuit on the aircraft DC bus 22. Thus, power will not flow to the motors 38, 42 and 46. Of course, the air pump, lube pump and fuel pump are flight critical components for the associated gas turbine engines 24 and 26, and it is important to maintain their operation.

To address a potential short circuit, a control 100 can sense when a short circuit occurs on the aircraft DC bus 22. Switch 70 is controlled by the control 100. Of course, the control 100 may be the main controller for the engine, and can communicate with many more items. However, for purposes of understanding this invention, all that need be understood is the control 100 controls the switch 70.

A voltage regulator 48 receives control voltage, normally from a line 50 from the accessory bus 32. However, an alternate line 54 provides power to the voltage regulator 48 through a diode 56. A battery bus 60 is connected to a battery 58, and through a line 62, and diode 66 to the aircraft DC bus 22. The battery bus also provides power through a diode 68 to a line 64 connected to the alternate control line 54.

FIG. 1 shows a normal power generation mode, such as would occur when the aircraft is in flight. The gas turbine engine drives the generator 28, and power is generated to power the motors 38, 42 and 46, and to deliver additional power to the aircraft DC bus 22. As shown, the power flowing to the aircraft DC bus passes through the engine accessory bus. The inverter/rectifiers 30 convert the AC power to a DC power.

In a start mode, the switches 70 and 72 are maintained closed. The diode 66 allows power to flow from the battery to the bus 22, and this power will then flow to the generator, to begin to operate the generator as a motor to start the gas turbine engine 24. Power will not flow from the battery through the diode 68, as there will be a higher voltage (typically 28 volts) on the accessory bus at this time than is supplied by the battery (typically 24 volts), and the diode 68 will be anti-biased.

If the control 100 detects a short circuit on the aircraft DC bus 22, the control 100 opens the switch 70. The diode 68 will now allow power to flow from the battery 58 to the control line 54, through the diode 56 and to the voltage regulator 48. Since the switch 70 is opened, power will not be drained from the engine accessory bus, but will continue to drive the motors 38, 42 and 46. At the same time, the battery, through the voltage flowing through the diode 68, will continue to provide the control voltage to voltage regulator 48 as necessary to power the voltage regulator. After some short period of time, the short circuit is corrected, and the control 100 can then close the switch 70. Once the short circuit is corrected, a higher voltage will be seen on the engine accessory bus than is supplied by the battery 58. At that time, the diode 68 will be anti-biased and power will not flow from the battery. The diode 66 is also anti-biased in this condition and blocks the power flow from the battery 58 to the aircraft dc bus.

While diodes 66 and 68 are disclosed, powered switches controlled by the control 100 can replace the diodes 66 and 68.

While the accessory bus 32 is shown as connected via the inverter/rectifier 30, and the power quality filter 34 with the aircraft DC bus, and each of the controllers 36, 40 and 44, it may also be possible to have the generator 28 deliver power to these devices without the intermediate accessory bus 32.

Although an embodiment of this invention has been disclosed, a worker of ordinary skill in this art would recognize that certain modifications would come within the scope of this invention. For that reason, the following claims should be studied to determine the true scope and content of this invention.

What is claimed is:

1. A generator and power system comprising:
a generator supplying electrical AC power to an AC accessory bus and then to a plurality of accessory motors to be associated with a gas turbine engine; and
said generator supplying power to an aircraft DC bus from said accessory bus in parallel with the supply to said accessories; and
a voltage regulator for said generator is provided with control voltage from said accessory bus when a switch is closed, but is provided with an alternative voltage source from a battery when said switch is opened.

2. The system as set forth in claim 1, wherein a power conversion device converts AC power from said AC accessory bus to DC power to be delivered to said aircraft DC bus.

3. The system as set forth in claim 2, wherein a rectifier converts the AC power to DC power.

4. The system as set forth in claim 1, wherein said accessories include at least a fuel pump.

5. The system as set forth in claim 1, wherein said accessories include at least a lube pump.

6. The system as set forth in claim 1, wherein said switch is opened when a short is sensed on the aircraft DC bus.

7. The system as set forth in claim 1, wherein a diode arrangement controls the flow of voltage from the battery to the voltage regulator when said switch is opened.

8. An aircraft engine comprising:
a gas turbine engine;
said gas turbine engine driving a generator, said generator supplying electrical AC power to an AC accessory bus and then to a plurality of accessories associated with said gas turbine engine;
said generator supplying power to an aircraft DC bus from said accessory bus in parallel with the supply to said accessories;
a power conversion device converts AC power from said AC accessory bus to DC power to be delivered to said aircraft DC bus, and said accessories include at least one of a fuel pump for supplying fuel to said gas turbine engine and a lube pump for supplying lubricant to said gas turbine engine;
said AC accessory bus delivering AC power to a motor controller which in turn communicates with a motor for said at least one of said fuel pump and said lube pump;
a voltage regulator for said generator also receiving a control voltage from said accessory bus, and the voltage regulator receiving the control voltage from an alternative source when a short circuit is detected on the aircraft DC bus.

9. The aircraft engine as set forth in claim 8, wherein there are a pair of voltage regulators for said generator receiving control voltage.

10. An aircraft engine comprising:
a gas turbine engine;
said gas turbine engine driving a generator, said generator supplying electrical AC power to an AC accessory bus and then to a plurality of accessories associated with said gas turbine engine;
said generator supplying power to an aircraft DC bus from said accessory bus in parallel with the supply to said accessories; and
a voltage regulator for said generator is provided with control voltage from said accessory bus when a switch is closed, but is provided with an alternative voltage source from a battery when said switch is opened.

11. The aircraft engine as set forth in claim 10, wherein said switch is opened when a short is sensed on the aircraft DC bus.

12. The aircraft engine as set forth in claim 10, wherein a diode arrangement controls the flow of voltage from the battery to the voltage regulator when said switch is opened.

13. A generator comprising:
a generator for generating AC power and delivering AC power to an accessory bus;
a voltage regulator for providing control to said generator, said voltage regulator normally receiving control voltage from said accessory bus; and
an alternative supply of control voltage to said voltage regulator being received from a battery when a short has been detected in a system associated with the generator.

14. The generator as set forth in claim 13, wherein a switch is opened when the short is detected, and diode arrangement controls the flow of voltage from the battery to the voltage regulator such that it will not occur after the switch has been closed.

* * * * *